M. R. COWELL.
COMBINED HORSE COLLAR AND HAMES.
APPLICATION FILED SEPT. 25, 1913.

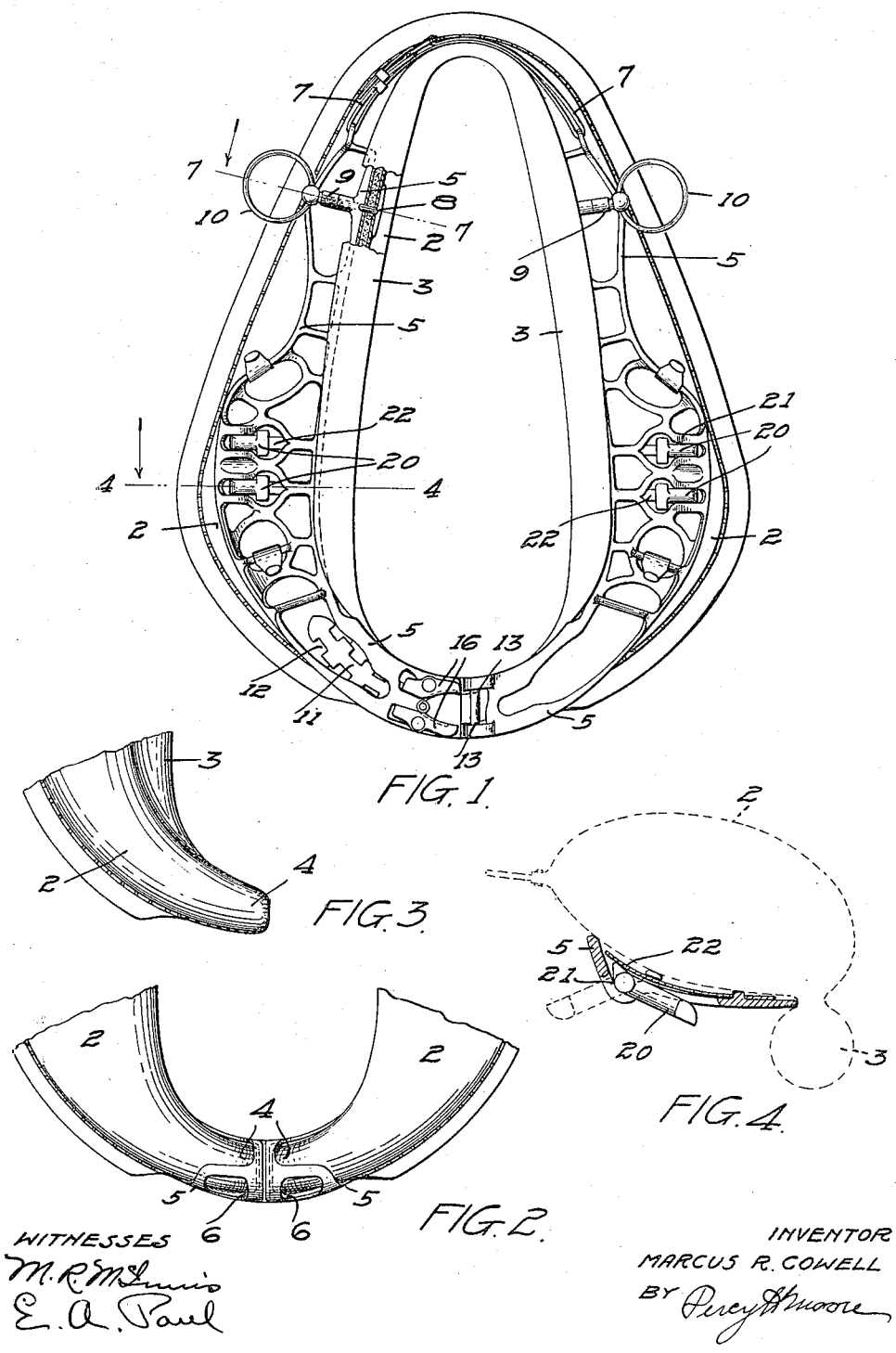

1,164,071.

Patented Dec. 14, 1915.
2 SHEETS—SHEET 2.

WITNESSES
M. R. McInnis
E. A. Paul

INVENTOR
MARCUS R. COWELL
BY Percy Moore
ATTORNEYS

UNITED STATES PATENT OFFICE.

MARCUS RAY COWELL, OF MINNEAPOLIS, MINNESOTA.

COMBINED HORSE COLLAR AND HAMES.

1,164,071. Specification of Letters Patent. Patented Dec. 14, 1915.

Application filed September 25, 1913. Serial No. 791,781.

*To all whom it may concern:*

Be it known that I, MARCUS RAY COWELL, a citizen of the United States of America, residing at Minneapolis, in the county of Hennepin and State of Minnesota, have invented certain new and useful Improvements in Combined Horse Collars and Hames, of which the following is a specification.

This invention relates to improvements in horse collars and hames, and particularly to that type in which the hames, after being fitted to the collar, are securely attached thereto and are not removed therefrom when the collar and hames are taken off from the horse.

The object of my invention is to provide a collar and hames that may be quickly attached or secured together and which may remain permanently connected during the period of use.

Another object of the invention is to provide means for readily adjusting the hames to different sized collars, and adjusting the combined hames and collars to different horses.

Another object of the invention is to provide hames with which ordinary collars, such as are now in general use, may be readily combined.

The invention consists generally in the constructions and combinations hereinafter described and particularly pointed out in the claims.

Figure 5:
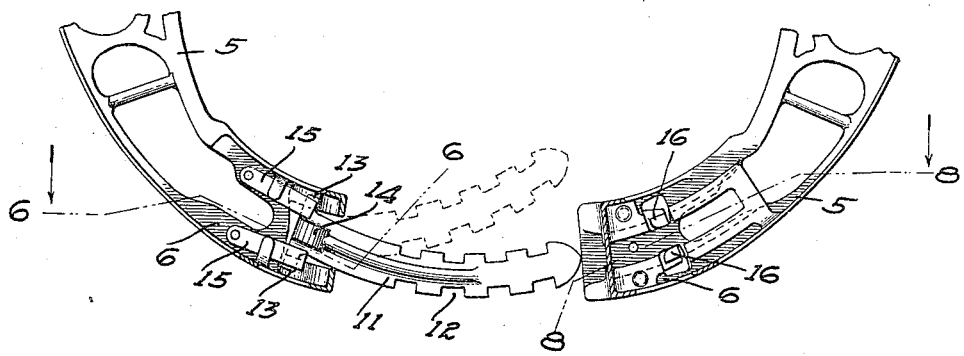
Figure 6:
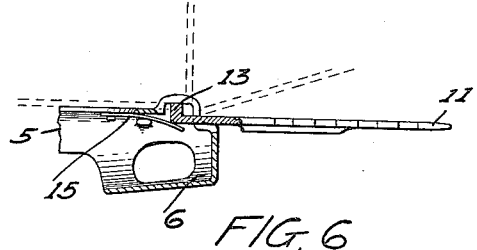
Figures 7, 8:
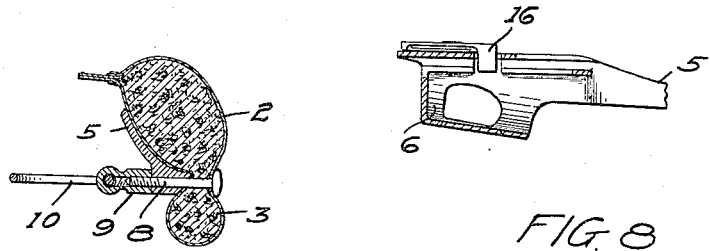
Figure 9:
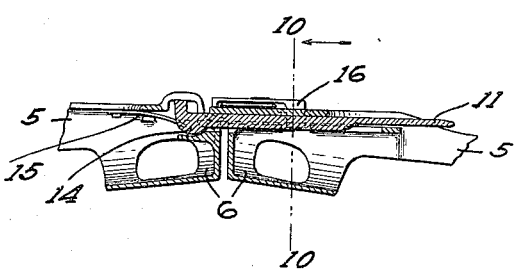
Figure 10:
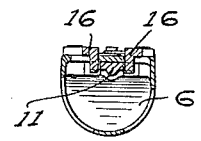

In the accompanying drawings forming part of this specification, Figure 1 is a front elevation of a collar and hames embodying my invention, a portion of the forewale being broken away to show the manner of securing the hames to the collar, Fig. 2 is a rear elevation of the lower portion of the collar and hames, Fig. 3 is a detail of the lower portion of one side of the collar, Fig. 4 is a transverse section through the hames on line 4—4 of Fig. 1, the outline of the collar being shown in dotted lines, Fig. 5 is a rear elevation of the lower part of the hame members, the housing being in section to show the arrangement of the fastening device, Fig. 6 is a detail section on line 6—6 of Fig. 5, Fig. 7 is a detail section on line 7—7 of Fig. 1, Fig. 8 is a section through the housing on line 8—8 of Fig. 5, Fig. 9 is a section through the lower portion of the hames members and fastening device, Fig. 10 is a section on line 10—10 of Fig. 9.

In the drawings, 2 represents the afterwale or pad of the collar and 3 the forewale. These parts are of ordinary construction except that the collar is continuous at the top and the forewale 3 does not extend to the lower portion of the throat of the collar, but stops substantially opposite the parts of the forewale or pad which come on the shoulders of the animal when the same is in use.

The afterwale 2 at its lower end is narrowed and pointed as shown at 4 in Fig. 3. Each hame or hames member consists preferably of an open metallic casting or grating 5 curved to fit the front of the afterwale, and having formed at its lower end a socket 6, into which the lower or pointed end 4 of the afterwale of the collar may be fitted, as shown in Fig. 2 of the drawings.

The outer faces of the ends of the sockets 6 are flat except that one of said faces has projecting from it the support for the spring controlled dogs 16. The faces of the sockets are therefore permitted to slide over each other either up or down when the device is in use and one of said faces has a limited movement outward over the other. There is, therefore a sliding movement of the faces of the sockets that are in contact with each other with every movement of the horse.

The upper ends of the hame members are connected over the top of the collar by a suitable strap 7, and threaded pins 8 pass through the thin part of the collar between the afterwale and the forewale (see Fig. 7), and through the hame member 5. A nut 9 engages the threaded end of each pin and thereby secures the upper end of each hame member to the upper portion of the collar.

I prefer to form the nut which screws on to the pin 8 as the base or support for the line ring 10. When the nut 9 is screwed firmly down on the pin 8 and the guide lines are passed through the rings 10, the nut 9 cannot become unscrewed from the pins 8, and as the lower ends of the collar are held in the socket 6 on the rear side of the hame members, it will be seen that the hame members are firmly secured to the collar.

The strap 7 which extends over the top of the collar may be of any desired length so that practically no change is required in the metal part of the hames to adapt the same for use upon a collar of any size. The strap 7 being adjustable it may be lengthened or shortened to fit over a collar of any length.

At the lower end of the hames and pivotally connected to one member thereof by a half ball and socket joint, is an adjustable connecting bar 11. This bar is provided with suitable notches 12 and at one end it is formed with a hinge member consisting of a boss 14 from the opposite side of which project lugs 13 preferably of rectangular form in cross section against which bear springs 15 secured to the hame casting at opposite sides of the boss 14. The socket to which the bar 11 is pivotally connected, has a flange with a concave upper face and the convex surface of the boss 14 on the bar 11 is sealed in this concave face of the flange as shown in Figs. 9 and 10 of the drawings.

The connecting bar 11 may be turned into position to extend across the space between the lower ends of the hames as shown in Fig. 5 of the drawings, and when the hame members are brought together it will project into a guide-way in the opposite hame member where the notches therein will be engaged by spring controlled dogs 16. These dogs will engage any pair of the notches in the bar 11 according to the adjustment of the lower end of the hames, and the loose connection between the pivotal end of said bar and the hame member permits said bar to have a rocking motion whereby it may be raised into the position indicated by dotted lines in Fig. 5, or it may be dropped down into a position below that shown in full lines in the same figure.

The pull or strain on the notched bar is taken by the bearing boss 14 and the curved recess in which it is seated. The edges of the lugs 13 are preferably out of contact with the housing as shown in Figs. 6 and 9 of the drawings. The springs 15 bearing against the lugs 13 tend to hold the bar in a position to which it may be turned. This manner of pivoting the bar 11 by means of a rounded boss fitting into a curved recess, these two parts forming in effect a half ball and socket joint, allows the free end of the bar to be moved up and down or in and out, thereby permitting the flat faces of the ends of the sockets to slide upon each other providing freedom of movement for the lower ends of the two sides of the collar to accommodate it, when in use, to the movements of the horse. When the collar is removed from the horse the bar 11 may be turned back against the hame member as indicated by the dotted lines in Fig. 6, where it is out of the way when handling the collar and hames, and danger of punching the horse with the end of the bar is obviated.

I prefer also to provide lugs 20 upon the side of the hame members, being held in position by suitable eyes 21 and being engaged by springs 22. These lugs may be turned back against the hames as shown by full lines in Fig. 4 or may be turned forward into the position indicated by dotted lines in the same figure. The springs 22 bear against the pivots of said lugs and tend to hold the same in either position to which they may be turned.

I have here shown two of the lugs 20 upon each of the hame members, one above the other. These lugs permit of a low or high draft connection being made between the hames and hames tugs, thus adapting the collar for use on horses of different sizes.

In ordinary practice the hames and collar will preferably be assembled at the factory and sold together. It is obvious, however, that the hames can be sold separately and can be attached to the ordinary collars now in use or to collars of different sizes, by providing holes for receiving the pins 8 and cutting the collar in two at the throat and shaping the ends to fit within the sockets at the lower ends of the hame members.

The details of the structure may obviously be modified in many particulars without departing from my invention.

I claim as my invention:

1. In a device of the kind described, a pair of hame members, each member having at its lower end a metallic socket with a flat outer face arranged to contact and to slide over the corresponding face of the socket of the other member, means for flexibly connecting the upper ends of said members, a notched bar flexibly jointed to the lower end of one of said members, and a guide-way upon the lower end of the other member into which said notched bar is adapted to enter, and a pair of dogs upon said member arranged to engage said notches and lock said bar in position, substantially as described.

2. In a device of the kind described, a pair of hame members, each member having at its lower end a metallic socket with a flat outer face arranged to contact and to slide over the corresponding face of the socket of the other member, means flexibly connecting the upper ends of said members, a connecting bar secured to the lower end of one of said members by a flexible joint, and means for securing the free end of said bar to the lower end of the other member, substantially as described.

3. The combination, with a pair of hame members, each formed of a metallic grating curved to fit the front of the afterwale of the collar, and having at its lower end a socket with a flat outer face adapted to contact and slide on the corresponding face of the socket of the other hame member, of a collar open at the throat and having its lower ends fitted to said sockets, means for connecting the upper portions of said hame members to said collar, and means for connecting the lower ends of said hame members, and permitting the faces of said sockets to slide one over the other, substantially as described.

4. The combination, with a pair of hame members, each provided at its lower end with a socket having a flat face adapted to contact with and slide over the corresponding face of the socket of the other member, of a collar open at the throat and provided with afterwales having their lower ends shaped to fit said sockets, means for securing the upper ends of said hame members to said collar, a notched bar flexibly jointed in the lower end of one of said sockets, a guide-way in the other socket into which said notched bar is adapted to enter, and a pair of dogs arranged to engage said notches and lock said bar in position, substantially as described.

5. As a new article of manufacture, a pair of hame members having integral sockets at their lower ends, one of said sockets being provided with an internal concave flange projecting inwardly from the end wall thereof, a notched bar having an enlargement adapted to seat upon said flange, the other of said sockets being slotted and provided with a pair of manually operated dogs, said notched bar being adapted to enter said slotted sockets and engage said dogs, and means for retaining said enlargement within the first mentioned socket.

6. As a new article of manufacture, a pair of hame members having integral sockets at their lower ends, one of said sockets being provided with a flange having a concave upper face, a notched bar having an enlargement seating within said flange, said enlargement having a convex lower face, springs arranged in said flanged sockets and engaging the end of said notched bar, and means on the other socket for releasably engaging the notches in said bar.

7. The combination, with a pair of hame members, each provided at its lower end with a socket, of a collar open at the throat and provided with afterwales having their lower ends shaped to fit said sockets, said hame members having apertures near their upper ends, pins extending through said apertures into said collar and a line ring connected to each of said pins, whereby when the lines are passed through the rings said pins are held in place, and upon the removal of said pins the collar and hames are separable.

In testimony whereof I affix my signature in presence of two witnesses.

MARCUS RAY COWELL.

Witnesses:
U. S. J. DUNBAR,
HENRY P. ALDEN.

Copies of this patent may be obtained for five cents each, by addressing the "Commissioner of Patents, Washington, D. C."